United States Patent [19]

Wolfgruber et al.

[11] Patent Number: 4,857,582

[45] Date of Patent: Aug. 15, 1989

[54] PROCESS FOR PREPARING COLLOIDAL SUSPENSIONS OF ORGANOPOLYSILOXANES

[75] Inventors: Matthias Wolfgruber; Bernward Deubzer; Volker Frey, all of Burghausen, Fed. Rep. of Germany

[73] Assignee: Wacker-Chemie GmbH, Munich, Fed. Rep. of Germany

[21] Appl. No.: 195,567

[22] Filed: May 18, 1988

[30] Foreign Application Priority Data

May 21, 1987 [DE] Fed. Rep. of Germany ....... 3717075

[51] Int. Cl.$^4$ ................................................ C08K 5/54
[52] U.S. Cl. ..................................... 524/730; 524/160; 524/588; 524/700; 524/745; 524/773; 524/775; 524/777; 524/858; 524/859; 524/863
[58] Field of Search ............... 524/745, 730, 588, 773, 524/775, 700, 858, 859, 863, 777, 160

[56] References Cited

U.S. PATENT DOCUMENTS

| | | | |
|---|---|---|---|
| 3,433,780 | 3/1969 | Cekada, Jr. et al. | 524/160 |
| 4,424,297 | 1/1984 | Bey | 524/777 |
| 4,525,502 | 6/1985 | Traver | 524/588 |
| 4,567,231 | 1/1986 | Huebner et al. | 524/588 |

Primary Examiner—Melvyn I. Marquis

[57] ABSTRACT

Colloidal suspensions of organopolysiloxanes are prepared by mixing an organosilicon compound selected from the group consisting of mixtures of alkoxysilanes and/or partial hydrolysates thereof and an organo(poly)siloxane which is optionally free of alkoxy groups and contains a maximum of 8 siloxane units, which is mixed with at least one alkoxysilane and/or a partial hydrolysate thereof, with water in the presence of an emulsifier, at a maximum rate of 5 moles of organosilicon compound per hour per liter of water, in which the organosilicon compound and the water is fed continuously, but separately from one another, into a reactor, in which at least one of the two substances contains an emulsifier, while the alkanol is being continuously removed by distillation from the aqueous suspension continuously emerging from the reactor. The aqueous suspension from which the alkanol has been removed by distillation is, if desired, recycled back into the reactor. A tubular reactor is preferably employed in which the water is added continuously at, or near the upper end of the tubular reactor and the organosilicon compound is added via several inlet points arranged along the longitudinal axis of the tubular reactor.

4 Claims, No Drawings

PROCESS FOR PREPARING COLLOIDAL SUSPENSIONS OF ORGANOPOLYSILOXANES

The present invention relates to colloidal suspensions of organopolysiloxanes and more particularly to a process for preparing colloidal suspensions of organopolysiloxanes.

BACKGROUND OF THE INVENTION

Colloidal suspensions of organosilsesquioxanes having an average particle size of from 10 to 100 nm and processes for preparing the same are described in U.S. Pat. No. 3,433,780 to Cekada, Jr. et al and in U.S. Pat. No. 4,424,297 to Bey. These suspensions are prepared by adding trialkoxysilanes to an agitated mixture of water and surfactants, in which the amount of trialkoxysilanes added is less than about 10 percent by weight, based on the total weight of the trialkoxysilanes, water and surfactants, or the addition rate is less than 10 moles of trialkoxysilanes per liter per hour.

Therefore, it is an object of the present invention to provide a process for the continuous and reproducible preparation of storage-stable colloidal suspensions of organopolysiloxanes having an average particle size of from 10 to 150 nm. Still another object of the invention is to provide a process for preparing organopolysiloxanes in which the organopolysiloxanes contain at least two different siloxane units, such as monoorganosiloxane, diorganosiloxane and triorganosiloxane units and $SiO_{4/2}$ units. A further object of the invention is to provide colloidal suspensions of organopolysiloxanes which have an organopolysiloxane solids content of up to 20 percent by weight, based on total weight of the suspension.

SUMMARY OF THE INVENTION

The foregoing objects and others which will become apparent from the following description are accomplished in accordance with this invention, generally speaking, by providing a process for preparing colloidal suspensions of organopolysiloxanes which comprises mixing organosilicon compounds selected from the group consisting of mixtures of alkoxysilanes of the formula $$R_aSi(OR^1)_{4-a}$$

and partial hydrolysates thereof, where R is selected from the group consisting of a hydrogen atom, a monovalent hydrocarbon radical having from 1 to 8 carbon atoms per radical and a substituted hydrocarbon radical having from 1 to 8 carbon atoms in which the substituents are inert to water, $R^1$ is selected from the group consisting of an alkyl radical having from 1 to 4 carbon atoms per radical, an alkoxyalkylene radical having from 1 to 4 carbon atoms per radical and a radical selected from the group consisting of —COCH₃, —COC₂H₅ and —CH₂CH₂OH, a is 0, 1, 2 or 3 with the proviso that the mixture contains at least two different silanes where the value of a is different in each and a is an average of from 1.0 to 2.0 and an organo(poly)siloxane which may be free of alkoxy groups and contains a maximum of 8 siloxane units, mixed with at least one alkoxysilane and/or a partial hydrolysate thereof with water, in the presence of an emulsifier at a maximum rate of 5 moles of organosilicon compound per hour per liter of water, in which the organosilicon compound and water are fed separately from one another, but continuously into a reactor, in which at least one of the two substances contains the emulsifier, and thereafter continuously distilling off the alkanol from the aqueous suspension continuously emerging from the reactor.

DETAILED DESCRIPTION OF THE INVENTION

The colloidal suspensions of organopolysiloxanes are obtained by introducing the organosilicon compound and water separately and continuously into a reactor in which the organosilicon compound and/or water contains an emulsifier while the alkanol is continuously being removed from the aqueous suspension continuously emerging from the reactor.

The reactor employed in the process of this invention may be any conventional reactor, such as a tubular reactor, a stirred kettle, a kettle cascade, a circulation reactor, a tray reactor and the like. If desired, the reactor may be provided with warming or cooling devices for heating or cooling the contents of the reactor.

In the process of this invention, a tubular reactor is preferably employed in which the water is added continuously at or near the upper end of the reactor and the organosilicon compound is added continuously via several feed inlets arranged along the longitudinal axis of the reactor, in which at least one of the two substances contain an emulsifier. At least two feed inlets, and more preferably from 5 to 10 feed inlets, are arranged along the longitudinal axis of the tubular reactor for introducing the organosilicon compound to the reactor. The feed inlets may be distributed over the entire length of the tubular reactor, but are preferably distributed over the first quarter to half of the length of the tubular reactor. The tubular reactor is preferably equipped with a device for warming or cooling the reactor contents.

In the process of this invention, the organosilicon compound is added at a maximum rate of 5 moles per hour per liter of water, and more preferably from 0.5 to 1 mole per hour per liter of water.

After sufficient residence time in the reactor to hydrolyze and condense the organosilicon compound employed, the aqueous suspension emerges continuously from the reactor. The residence time is preferably at least 5 minutes, and more preferably from 30 to 60 minutes.

The alkanol formed as a result of the hydrolysis of the organosilicon compound is continuously removed by distillation from the aqueous suspension emerging from the reactor. The alkanol is preferably removed by molecular distillation. Thin-film evaporators, for example, are suitable for this purpose. During this operation, the same volume is preferably distilled off per unit time as is added through the organosilicon compound, in which the volume flow of water is constant.

In order to increase the solids content of the organopolysiloxane, the aqueous suspension is continuously recycled through the reactor, along with the organosilicon compound and, if appropriate, emulsifier. If desired, the aqueous suspension can be circulated several times until the desired solids content of the organopolysiloxane is obtained. Some of the resultant aqueous suspension having the desired solids content is then removed continuously, and the remainder is continuously recycled into the reactor and again mixed continuously with water, organosilicon compound and emulsifier.

Aqueous organopolysiloxane suspensions having a solids content of up to about 20 percent by weight, based on the total weight of the suspension, can be obtained, where the maximum possible solids content in the aqueous suspension is dependent on the SiC-bonded organic radicals in the organopolysiloxanes.

In the process of this invention, the organopolysiloxane composition is reproducible and its reproducibility is ensured since distillation takes place outside the reactor and the volatile organosilicon compounds, or ones which are slow to hydrolyze, such as dimethyldimethoxysilane or hexamethyldisiloxane, can be converted into organopolysiloxanes with sufficient residence time in the reactor and, therefore, are not distilled off with the alkanol.

The process of this invention is preferably carried out at from 15° to 90° C., and more preferably from 60° to 85° C. The process is preferably carried out at the pressure of the ambient atmosphere, i.e., at 1020 hPa (abs.) or about 1020 hPa (abs.). However, it may also be carried out at higher or lower pressures.

In the process of this invention, the organosilicon compound employed is preferably mixtures of alkoxysilanes, and more preferably, a mixture containing silanes of the formulas RSi(OR$^1$)$_3$ and R$_2$Si(OR$^1$)$_2$, in which R and R$^1$ are the same as above. Generally, silanes of the formulas RSi(OR$^1$)$_3$ and R$_2$Si(OR$^1$)$_2$ are preferably employed in a molar ratio 0.1 to 3.0, and more preferably in a molar ratio of from 0.4 to 2.3.

In the process of this invention, the organosilicon compound employed may also be a partial hydrolysate of the silane mixture mentioned above having a maximum of 10 silicon atoms per partial hydrolysate.

In the process of this invention, the organosilicon compound employed may be an organo(poly)siloxane which may be free of alkoxy groups and contains a maximum of 8 siloxane units per molecule which is mixed with at least one alkoxysilane and/or a partial hydrolysate thereof. The organo(poly)siloxane has a maximum of 8 siloxane units per molecule and may be a linear organo(poly)siloxane of the formula

R$_3$SiO(SiR$_2$O)$_n$SiR$_3$ where R is the same as above and n is 0 or an integer from 1 to 6. In the above formula, n is preferably 0, and the preferred organo(poly)siloxane is hexamethyldisiloxane. The organo(poly)siloxane having a maximum of 8 siloxane units per molecule may also be a cyclic organo(poly)siloxane of the formula (R$_2$SiO)$_m$ where R is the same as above and m is an integer from 3 to 8, and more preferably 4.

The organo(poly)siloxane employed, which is mixed with at least one alkoxysilane, is preferably a hexaorganodisiloxane mixed with a tetraalkoxysilane in a molar ratio of from 0.25 to 1.0. More preferably, hexamethyldisiloxane is mixed with tetraethyl silicate in a molar ratio of from 0.25 to 1.0. In addition, the organo(poly)siloxane employed in admixture with at least one alkoxysilane is preferably a cyclic organosiloxane which is mixed with a trialkoxysilane, and more preferably a tetrameric cyclic organosiloxane mixed with a tetraalkoxysilane.

Examples of SiC-bonded organic radicals represented by R above, are alkyl radicals, such as the methyl, ethyl, n-propyl, isopropyl, n-butyl, sec-butyl, amyl, hexyl, -ethylhexyl and heptyl radicals; alkenyl radicals, such as the vinyl, allyl and butenyl radicals; alkynyl radicals; cycloalkyl radicals, such as the cyclobutyl, cyclohexyl and methylcyclohexyl radicals; aryl radicals, such as the phenyl radical; alkaryl radicals, such as tolyl radicals; and aralkyl radicals, such as the benzyl radical. The methyl, vinyl and phenyl radicals are the preferred hydrocarbon radicals represented by R.

Examples of substituted SiC-bonded organic radicals represented by R above are halogenated hydrocarbon radicals, such as the chloromethyl, 3-chloropropyl, 3-bromopropyl, 3,3,3-trifluoropropyl and 5,5,5-4,4,3,3-heptafluoropentyl radicals, and also the chlorophenyl, dichlorophenyl and trifluorotolyl radicals; mercaptoalkyl radicals, such as the 2-mercaptoethyl and 3-mercaptopropyl radicals; cyanoalkyl radicals, such as the 2-cyanoethyl and 3-cyanopropyl radicals; aminoalkyl radicals, such as the 3-aminopropyl, N-(2-aminoethyl)-3-aminopropyl and N-(2-aminoethyl)-3-amino(2-aminoethyl)-3-aminopropyl and N-(2-aminoethyl)-3-amino(2-methyl)propyl radicals; aminoaryl radicals, such as the aminophenyl radical; acyloxyalkyl radicals, such as the 3-acryloxypropyl and 3-methacryloxypropyl radicals; hydroxyalkyl radicals, such as the hydroxypropyl radical; and radicals of the formulas

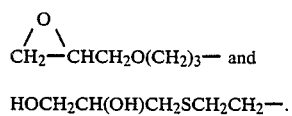

CH$_2$—CHCH$_2$O(CH$_2$)$_3$— and

HOCH$_2$CH(OH)CH$_2$SCH$_2$CH$_2$—.

Examples of hydrocarbon radicals, represented by R$^1$ are alkyl radicals, such as the methyl, ethyl, n-propyl, isopropyl, n-butyl, sec-butyl and tert-butyl radicals; and alkoxyalkylene radicals, such as the methoxyethylene and ethoxyethylene radicals. The methyl and ethyl radicals are the preferred R$^1$ radicals.

The emulsifiers employed in the preparation of the colloidal suspensions include carboxylic acids having 9 to 20 carbon atoms, aliphatic-substituted benzenesulfonic acids having at least 6 carbon atoms in the aliphatic substituents, aliphatic-substituted napthalenesulfonic acids having at least 4 carbon atoms in the aliphatic substituents, aliphatic sulfonic acids having at least 6 carbon atoms in the aliphatic substituents, silylalkylsulfonic acids having at least 6 carbon atoms in the aliphatic substituents, silylalkylsulfonic acids having at least 6 carbon atoms in the alkyl substituents, aliphatic-substituted diphenyl ether sulfonic acids having at least 6 carbon atoms in the aliphatic substituents, alkyl bisulfates having at least 6 carbon atoms in the alkyl substituents, quaternary ammonium halides and quaternary ammonium hydroxides. All the acids mentioned may be used as such, or if desired, they may be mixed with their salts.

If anionic emulsifiers are employed, it is preferred to use those emulsifiers whose aliphatic substituents contain at least 8 and more preferably 12 carbon atoms. Specific examples of aliphatic substituents are octyl, decyl, dodecyl, cetyl, stearyl, myricyl, oleyl, nonenyl, octynyl, phytyl and pentadecadienyl radicals. Preferred anionic emulsifiers are aliphatic-substituted benzenesulfonic acids.

If cationic emulsifiers are used, it is preferred that halides and, more preferably, chlorides and bromides be used.

The amount of emulsifier employed may be very low, due to the extraordinarily small particle size of the colloidal organopolysiloxane suspensions, which are on the average of from about 10 to 150 nm. The emulsifier is preferably used in an amount of from 0.5 to 2.9 percent by weight, and more preferably in an amount of from 1.5 to 2.0 percent by weight, based on the weight of the organosilicon compound employed.

The emulsifier may be added either with the water or with the organosilicon compounds employed in the process of this invention.

In many applications, however, emulsifiers which can be washed out or are capable of diffusion and accumulate at the interfaces can have an interfering effect. In the process of this invention, it may, therefore, be preferred that the abovementioned emulsifiers be replaced by addition salts of acetic acid with 3-aminopropyltrimethoxysilane or 3-aminopropyltriethoxysilane and more preferably by addition salts of acetic acid with N-(2-aminoethyl)-3-aminopropyltrimethoxysilane or N-(2-aminoethyl)-3-aminopropyltriethoxysilane, which are hydrolyzed together with the organosilicon compounds employed in the process of this invention.

When 3-aminopropyltrimethoxysilane or 3-aminopropyltriethoxysilane and N-(2-aminoethyl)-3-aminopropyltrimethoxysilane or N-(2-aminoethyl)-3-aminopropyltriethoxysilane are employed, they are preferably employed in an amount of from 5 to 20 percent by weight, based on the weight of the organosilicon compounds employed.

Also, it is possible to use addition salts of sodium sulfite with 3-glycidoxypropyltrimethoxysilane or 3-glycidoxypropyltriethoxysilane in the process of this invention.

The organopolysiloxanes formed as a result of this process and their properties, such as the degree of hydrolysis and condensation, molecular weight, solubility behavior or melting point, can be influenced by a choice of reaction parameters, such as temperature, and in particular, the pH, and in addition the type and concentration of the emulsifiers. The preparation of the colloidal suspensions of the organopolysiloxanes can take place either in an acidic, neutral or alkaline medium. In general, the condensation is the rate-determining step in an acidic medium, and the hydrolysis is the rate-determining step in an alkaline medium.

Colloidal suspensions of organopolysiloxanes comprising units of the formula

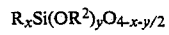

are prepared by the process of this invention, where R is the same as above, $R^2$, which may be the same or different, represents a hydrogen atom or an alkyl or alkoxyalkylene radical having from 1 to 4 carbon atoms per radical, x is 0, 1, 2 or 3, with the proviso that the organopolysiloxanes contain at least two different units having a value of x which is different in each case, in which x is an average of from 1.0 to 2.0, and y is 0, 1 or 2, preferably an average of from 0.0 to 0.5.

The specific examples of hydrocarbon radicals represented by $R^1$ also applies to the examples of hydrocarbon radicals represented by $R^2$.

Colloidal suspensions of organopolysiloxanes which contain $RSiO_{3/2}$ units and $R_2SiO_{2/2}$ units where R is the same as above and where the ratio of $RSiO_{3/2}$ units to $R_2SiO_{2/2}$ units preferably varies from 0.1 to 3.0 and more preferably from 0.4 to 2.3, are preferably prepared by the process of this invention.

Colloidal suspensions of the organopolysiloxanes which contain $SiO_{4/2}$ units and $R_3SiO_{\frac{1}{2}}$ units where R is the same as above and where the ratio of $SiO_{4/2}$ units to $R_3SiO_{\frac{1}{2}}$ units preferably varies from 0.5 to 2.0 are, likewise, preferably prepared by the process of this invention.

Preferably, the organopolysiloxanes prepared by the process of this invention are solid at room temperature.

The colloidal suspensions of organopolysiloxanes have an average particle diameter of from 10 to 150 nm. In addition, they are storage stable, i.e., the suspensions can be stored for at least 12 months without detectable deposition occurring.

The colloidal suspensions prepared according to this invention can be used directly for many applications, but the organopolysiloxanes which they contain may, if desired, also be separated from the colloidal suspension in a conventional manner, for example, by salt addition, precipitation by means of polar solvents or by evaporation of the water.

The colloidal organopolysiloxane suspensions prepared according to this invention can be employed for impregnating and coating purposes, for example, in protecting buildings, for waterproofing plaster, or in the treatment of paper and textiles. The water may be removed from the colloidal organopolysiloxane suspensions at room temperature and at the pressure of the ambient atmosphere, i.e., about 1020 hPa (abs.) or under reduced pressure or at elevated temperature to form transparent resin films which cannot be redispersed. The organopolysiloxanes obtained from this invention contain monoorganosiloxane and diorganosiloxane units or $SiO_{4/2}$ units and triorganosiloxane units.

EXAMPLE 1

Four liters per hour of a water/emulsifier mixture containing 24 g of dodecylbenzenesulfonic acid in 4 liters of water are introduced continuously with the aid of a hose pump into a 4 liter tubular reactor maintained at 65° C. and having an internal diameter of 3 cm. About 400 ml per hour of the respective organosilicon compound from Table 1 are added continuously with the aid of metering pumps to the water/emulsifier mixture via five different feed inlets arranged along the longitudinal axis of the tubular reactor in the first third of the tubular reactor. The reaction mixture emerging from the tubular reactor is transferred continuously into a thin-film evaporator. About 400 ml per hour of a methanol/water mixture are continuously removed by distillation in the thin-film evaporator. The temperature and circulation rate of the thin-film evaporator are selected so that the same volume is distilled off per hour in each case as added in each case through the organosilicon compound. In the preparation of suspensions (A) to (C), a maximum of 5 percent by weight of the employed amount of dimethyldimethoxysilane are present in the distillate of the methanol/water mixture. After the distillation, the aqueous suspension is continuously fed back into the tubular reactor and again charged therein with the particular organosilicon compounds from Table 1. After four passes, 1 liter of the colloidal aqueous suspension are removed per hour, 3 liters of the colloidal aqueous suspension are recycled back per hour into the tubular reactor, and 1 liter of fresh water/emulsifier mixture are added per hour. The organosilicon compound from Table 1 is added via the five feed inlets, as described above, in each case at a constant volume flow of 400 ml per hour.

Slightly opalescent, aqueous suspensions of organopolysiloxanes (A) to (D) having particle sizes of from 10 to 40 nm, as determined by electron microscopy, viscosities of from 5 to 15 mPa.s at 25° C. and an organopolysiloxane solids content of 20 percent by weight, based on the total weight of the suspension, are obtained. Suspensions (A) to (D) are storage stable, i.e., no detectable deposition occurs even after storage for 12 months, and on evaporation of the water at room temperature at the pressure of the ambient atmosphere, brittle to resinous, transparent films which cannot be redispersed are obtained.

TABLE 1

| | Organosilicon Compound (400 ml Mixture) | Molar Ratio T Unit:D Unit* |
|---|---|---|
| (A) | 193 g of methyltrimethoxysilane<br>170 g of dimethyldimethoxysilane | 1:1 |
| (B) | 276.5 g of methyltrimethoxysilane<br>105 g of dimethyldimethoxysilane | 7:3 |
| (C) | 193.5 g of vinyltrimethoxysilane<br>157 g of dimethyldimethoxysilane | 1:1 |
| (D) | 276.5 g of methyltrimethoxysilane<br>65 g of octamethylcyclotetrasiloxane | 7:3 |

*T Unit: Siloxane unit containing an SiC-bonded radical.
D Unit: Siloxane unit containing two SiC-bonded organic radicals.

EXAMPLE 2

The procedure of Example 1 is repeated, except that the contents of the tubular reactor are kept at 85° C. instead of at 65° C., and 400 ml per hour of the organosilicon compound of Table 2 are substituted for the organosilicon compound of Table 1, and 400 ml per hour of an ethanol/water mixture are distilled off in the thin-film evaporator instead of a methanol/water mixture. In the preparation of suspensions (E) to (G), a maximum of 5 percent by weight of the amount of hexamethyldisiloxane employed is present in the distillate of the ethanol/water mixture.

Milky, aqueous suspensions of organopolysiloxanes (E) to (G) are obtained having particle sizes of from 70 to 140 nm, as determined by electron microscopy, viscosities of from 5 to 20 mPa.s at 25° C., and an organopolysiloxane solids content of from 16 to 19 percent by weight, based on the total weight of the suspension. Suspensions (E) to (G) are storage stable, i.e., no detectable deposition occurs even after storage for 12 months. The organopolysiloxanes in suspensions (F) and (G) are soluble in nonpolar solvents. After evaporation of the water at room temperature at the pressure of the ambient atmosphere, suspensions (F) and (G) form transparent films, which cannot be redispersed.

TABLE 2

| | Organosilicon Compound (400 ml Mixture) | Molar Ratio M Unit:Q Unit** |
|---|---|---|
| (E) | 65.3 g of hexamethyldisiloxane<br>336 g of tetraethyl silicate | 1:2 |
| (F) | 98.5 g of hexamethyldisiloxane<br>253 g of tetraethyl silicate | 1:1 |
| (G) | 127 g of hexamethyldisiloxane<br>217 g of tetraethyl silicate | 3:2 |

**M Unit: Siloxane unit containing three SiC-bonded organic radicals.
Q Unit: $SiO_{4/2}$ unit.

EXAMPLE 3

Eight liters per hour of water containing 50 g of glacial acetic acid in 8 liters of water are introduced continuously into the tubular reactor described in Example 1 and warmed at 65° C. About 600 ml of a mixture containing 342 g of methyltrimethoxysilane, 162 g of dimethyldimethoxysilane and 60 g of N-(2-aminoethyl)-3-aminopropyltrimethoxysilane are added continuously via the five feed inlet points for the organosilicon compound. The reaction mixture emerging from the tubular reactor is transferred continuously into a thin-film evaporator. About 600 ml of a methanol/water mixture are removed per hour by continuous distillation in the thin-film evaporator. After the distillation, 50 g of glacial acetic acid are added continuously per hour to the aqueous suspension, after which the aqueous suspension is recycled back into the tubular reactor. After 4 passes, 2 liters per hour of the colloidal aqueous suspension are removed continuously, 6 liters per hour of the colloidal aqueous suspension are fed back into the tubular reactor, and 2 liters per hour of fresh water/glacial acetic acid mixture are fed into the tubular reactor. The mixture comprising methyltrimethoxysilane, dimethyldimethoxysilane and N-(2-aminoethyl)-3-aminopropyltrimethoxysilane is added via the five inlet points as described above, at a constant volume flow of 600 ml per hour.

An opalescent, aqueous organopolysiloxane suspension having a particle size of 30 to 60 nm, as determined by electron microscopy, a viscosity of 22 mPa.s at 25° C., and an organopolysiloxane solids content of 17 percent by weight, based on the total weight of the suspension, is obtained.

COMPARISON EXAMPLE $V_1$ (a) About 1.5 liters of water and 9 g of dodecylbenzenesulfonic acid are introduced into a 3 liter flask equipped with stirrer, dropping funnel and distillation bridge. About 590 ml of a mixture containing 290 g of methyltrimethoxysilane and 255 g of dimethyldimethoxysilane [similar to Example 1(A)], are introduced at 65° C. and at 400 mbar over 5 hours through a capillary dipping into the flask, and the methanol produced on hydrolysis is at the same time removed by distillation. The distillate of the methanol/water mixture contains 50 percent by weight of the amount of the dimethyldimethoxysilane employed.

(b) The procedure of (a) is repeated, except that, at 85° C. instead of at 65° C., 709 ml of a mixture containing 174.5 g of hexamethyldisiloxane and 448 g of tetraethyl silicate, [similar to Example 2(F)], are added instead of 590 ml of a mixture containing 290 g of methyltrimethoxysilane and 255 g of dimethyldimethoxysilane, [similar to Example 1(A)]. The distillate of the ethanol/water mixture contains 70 percent by weight of the amount of hexamethyldisiloxane employed.

COMPARISON EXAMPLE $V_2$

A mixture containing 1.5 liters of water and 95 ml of a 10 percent solution of dodecyldiphenyl ether disulfonic acid mixed with its sodium salt, in which the mixture has a pH of 2.5, is introduced into a 3 liter flask equipped with stirrer, dropping funnel and reflux condenser. About 650 g of methyltrimethoxysilane are introduced at 65° C. and at 1020 hPa (abs.) over a period of 5 hours through a capillary dipping into the flask.

In addition to gelatinous deposits, a turbid, milky aqueous organopolysiloxane suspension having a particle size of 60 nm, as determined by electron microscopy, and an organopolysiloxane solids content of 13 percent by weight, based on the total weight of the suspension, is obtained. After evaporation of the water at room temperature and at the pressure of the ambient atmosphere, a powder is obtained from the suspension.

What is claimed is:

1. A process for preparing colloidal suspensions of organopolysiloxanes which comprises mixing an organosilicon compound selected from the group consisting of (a) mixtures of alkoxysilanes of the formula $$R_aSi(OR^1)_{4-a},$$

and/or partial hydrolysates thereof, where R is selected from the group consisting of a hydrogen atom, a monovalent hydrocarbon radical having from 1 to 8 carbon atoms per radical, and a substituted monovalent hydrocarbon radical in which the substituents are inert to water, $R^1$ is selected from the group consisting of an alkyl radical having from 1 to 4 carbon atoms per radical, an alkoxyalkylene radical having from 1 to 4 carbon atoms per radical and a radical selected from the group consisting of $-COCH_3$, $-COC_2H_5$ and $-CH_2CH_2OH$, a is 0, 1, 2 or 3, with the proviso that the mixtures contain at least two different silanes where each have a different value for a, and a has an average of from 1.0 to 2.0, and (b) an organo(poly)siloxane which contains a maximum of 8 siloxane units, and is mixed with at least one alkoxysilane and/or a partial hydrolysate thereof, with water, in the presence of an emulsifier at a maximum rate of 5 moles of organosilicon compound per hour per liter of water, in which the organosilicon compound and water are fed continuously, but separately, to a reactor and at least one of the two substances contain the emulsifier, removing an alkanol continuously from the aqueous suspension emerging continuously from the reactor and thereafter continuously recycling the aqueous suspension from which the alkanol has been removed into the reactor.

2. A process for preparing colloidal suspensions of organopolysiloxanes which comprises mixing an organosilicon compound selected from the group consisting of (a) mixtures of alkoxysilanes of the formula $$R_aSi(OR^1)_{4-a},$$

and/or partial hydrolysates thereof, where R is selected from the group consisting of a hydrogen atom, a monovalent hydrocarbon radical having from 1 to 8 carbon atoms per radical, and a substituted monovalent hydrocarbon radical in which the substituents are inert to water, $R^1$ is selected from the group consisting of an alkyl radical having from 1 to 4 carbon atoms per radical, an alkoxyalkylene radical having from 1 to 4 carbon atoms per radical and a radical selected from the group consisting of $-COCH_3$, $-COC_2H_5$ and $-CH_2CH_2OH$, a is 0, 1, 2 or 3, with the proviso that the mixtures contain at least two different silanes where each have a different value for a, and a has an average of from 1.0 to 2.0, and (b) an organo(poly)siloxane which contains a maximum of 8 siloxane units, and is mixed with at least one alkoxysilane and/or a partial hydrolysate thereof, with water, in the presence of an emulsifier at a maximum rate of 5 moles of organosilicon compound per hour per liter of water, in which the organosilicon compound and water are fed continuously into a tube reactor, in which the water is added at the upper end of the tubular reactor and the organosilicon compound is added via several inlet points arranged along the longitudinal axis of the tubular reactor and at least one of the two substances contain the emulsifier, and thereafter removing an alkanol continuously from the aqueous suspension emerging continuously from the reactor.

3. The process of claim 2, wherein the aqueous suspension from which the alkanol has been removed is recycled into the reactor.

4. The process of claims 1, 2 or 3, wherein the emulsifier is an addition salt of acetic acid with N-(2-aminoethyl)-3-aminopropyltrimethoxysilane or N-(2-aminoethyl)-3-aminopropyltriethoxysilane.

* * * * *